United States Patent

[11] 3,557,966

| [72] | Inventor | Leroy F. Skubic |
| | | Long Beach, Ind. |
| [21] | Appl. No. | 835,496 |
| [22] | Filed | June 23, 1969 |
| [45] | Patented | Jan. 26, 1971 |
| [73] | Assignee | The Paltier Corporation |

[54] PYRAMID KNOCKDOWN RACK WITH ADJUSTABLE SHELF FOR TIRE STORAGE
7 Claims, 9 Drawing Figs.

[52] U.S. Cl. .................................................. 211/24
[51] Int. Cl. .................................................. A47f 7/04
[50] Field of Search .......................... 211/23, 24, 177, 178, 182

[56] References Cited
UNITED STATES PATENTS

| 1,304,902 | 5/1919 | Pond | 211/23 |
| 1,380,802 | 6/1921 | House | 211/23 |
| 1,438,729 | 12/1922 | Vance | 211/23 |
| 1,691,621 | 11/1928 | Young | 280/49 |
| 2,262,794 | 11/1941 | Burbank | 211/23X |
| 3,184,068 | 5/1965 | Wende | 211/23 |
| 3,348,698 | 10/1967 | McConnell | |

*Primary Examiner*—Nile C. Byers, Jr.
*Attorney*—Wolfe, Hubbard, Voit & Osann

ABSTRACT: A pyramid-type tiering rack for tire storage having removable vertical posts which are shorter than the length of the rack so that they may be compactly stored in the rack base when not used, but which may be assembled to form a structure taller than the length of said rack and thus capable of storing large tractor-size tires or double layers of regular-size tires. The rack includes a shelf that is removably supported in an elevated position on said vertical posts by means of C-shaped retainer brackets which limit vertical and horizontal movement of said shelf with respect to said bracket without auxiliary fasteners.

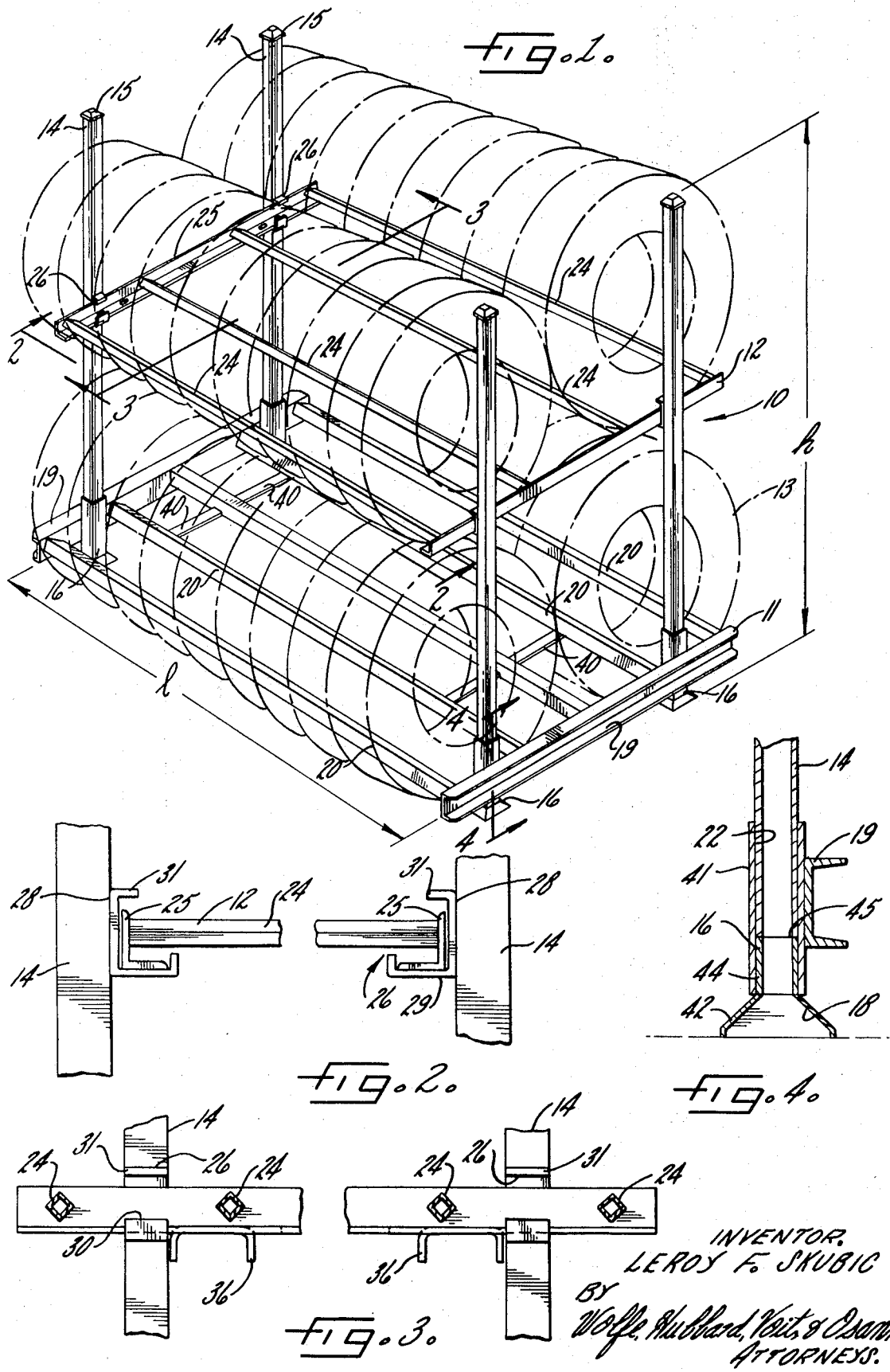

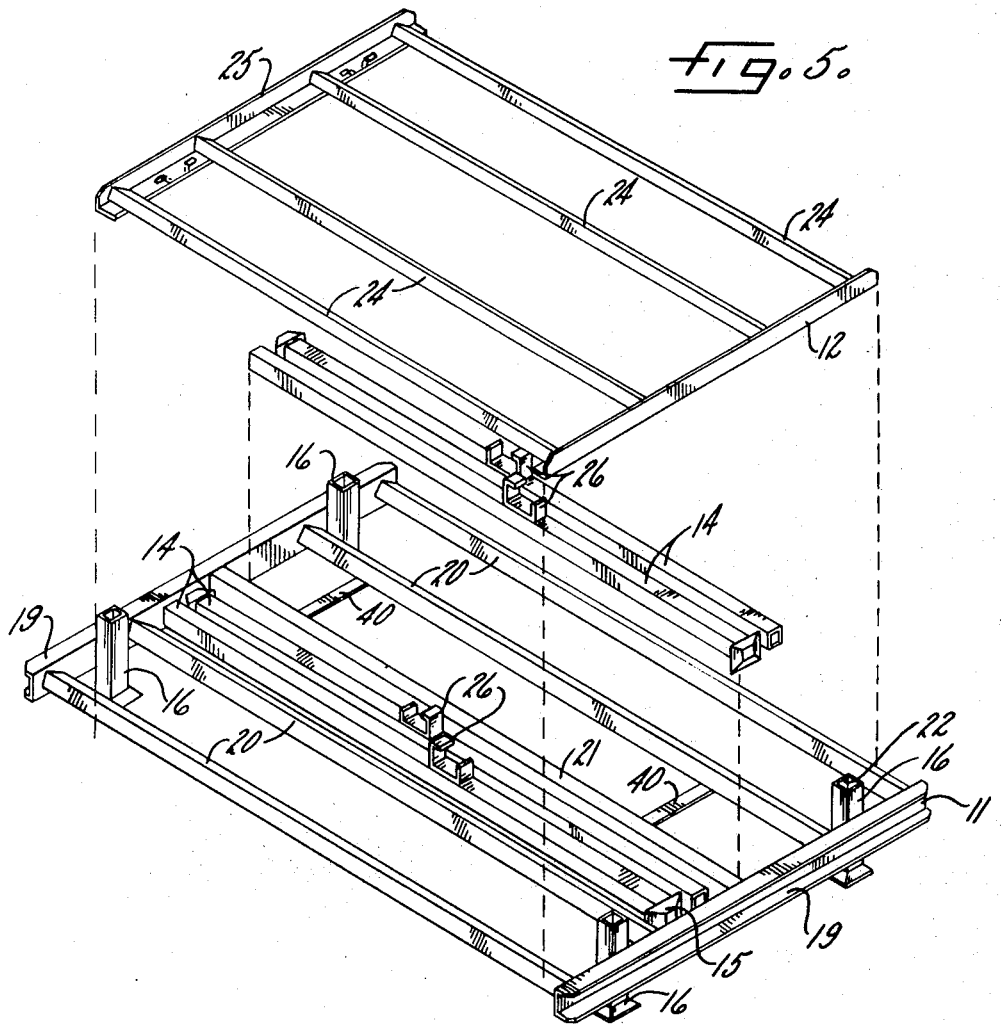
fig.5.
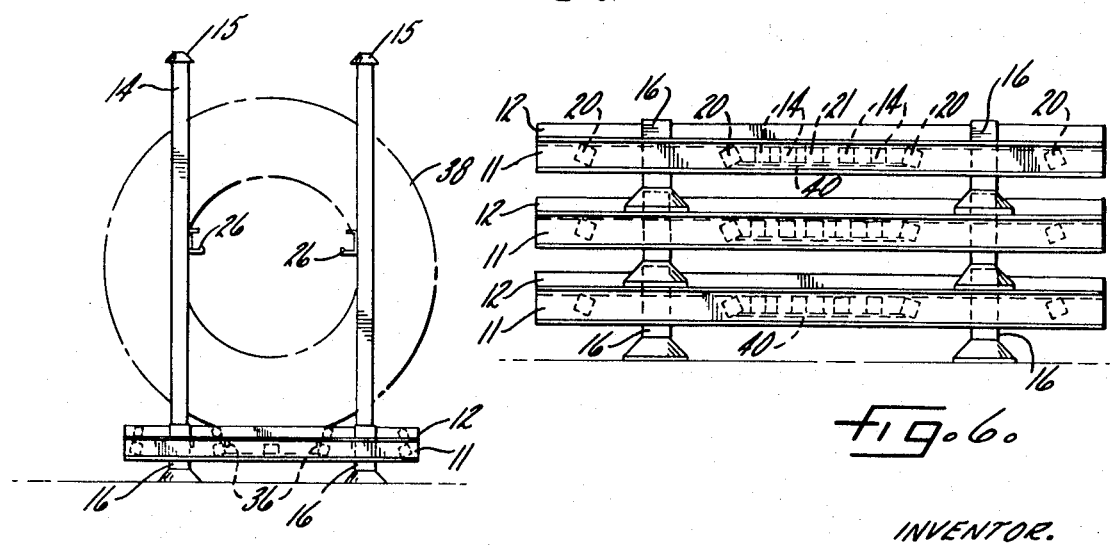
fig.7.
fig.6.
INVENTOR.
LEROY F. SKUBIC
BY
Wolfe, Hubbard, Voit & Osann
ATTORNEYS.

PYRAMID KNOCKDOWN RACK WITH ADJUSTABLE SHELF FOR TIRE STORAGE

The present invention relates generally to load supporting tiering frames, and more particularly, to a pyramid knockdown type tiering rack for tire storage.

Tire storage racks of the above type generally must have a height sufficient to store two layers of automobile-size tires, or a single layer of large tractor-size tires. The height of such racks, therefore, is often somewhat greater than the length or width dimensions of the rack base.

It is an object of the present invention to provide a tiering rack of the character set forth which may be disassembled and stored as a compact unit. A related object is to provide a tiering rack of the above kind having vertical posts which may be assembled to form a tiering rack of standard height for tire storage and which may be disassembled and conveniently stored within a rack base having dimensions less than the height of the rack.

Another object of the invention is to provide a tiering rack as characterized above which may be quickly and easily assembled and disassembled, while providing unusually secure support for the main components of the rack, without the need for auxiliary fasteners such as screws or the like. In this regard, it is a related object to provide a tiering rack in which the rack upright posts have a shelf-retaining means which removably receives and securely engages the shelf to prevent relative lateral or tilting movement of the shelf.

A further object is to provide a rack of the above kind capable of accommodating tied bundles of tires for storage, or alternatively, freely supporting untied rows of tires to facilitate easy selection and removal of individual tires from the rack.

Other objects and advantages of the invention will become apparent from the following detailed description and upon reference to the drawings, in which:

FIG. 1 is a perspective view of a tiering rack embodying the present invention with two layers of automobile-size tires shown in phantom in their loaded position;

FIG. 2 is an enlarged fragmentary elevation view taken in the plane of line 2—2 in FIG. 1 showing the retainer brackets supporting the rack shelf;

FIG. 3 is an enlarged fragmentary section taken in the plane of line 3—3 in FIG. 1;

FIG. 4 is an enlarged fragmentary section taken in the plane of line 4—4 in FIG. 1;

FIG. 5 is perspective view of the tiering rack shown in FIG. 1 with the parts disassembled and shown in position to be packed for storage;

FIG. 6 is an end elevation view of three disassembled racks stacked for storage;

FIG. 7 is an elevation view of a tiering rack similar to that shown in FIG. 1 with the adjustable shelf in its lowered position for supporting and storing large tractor-size tires;

Figure 8:
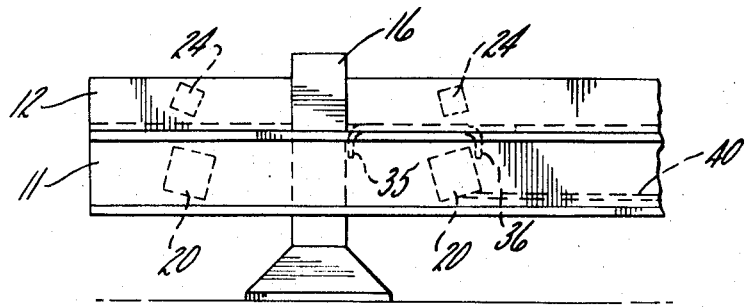
FIG. 8 is an enlarged fragmentary view of the rack base shown in FIG. 7 illustrating the manner in which the adjustable shelf is supported thereon.

While the invention is susceptible of various modifications and alternative forms, certain specific embodiments thereof are shown by way of example in the drawings and will be described herein. It should be understood, however, that it is not intended to limit the invention to the particular forms disclosed. On the contrary, the invention is to cover all modifications, equivalents, and alternatives falling within the spirit and scope of the invention.

Referring more particularly to FIG. 1 of the drawings, the invention is there exemplified in an illustrative tiering rack 10 supporting two layers of automobile-size tires 13 shown in phantom. The rack 10 includes a base 11 and a removable shelf 12 supported in a raised position by uprights or posts 14 secured by and extending upwardly from the base 11. The tops of the uprights each are formed with a tapered end 15, having in this case a pyramid-type configuration. The base 11 is supported by legs 16, as shown in FIG. 4, which each have a bottom internal socket 18 shaped complementary to the tapered pyramid-shaped post top 15. The rack 10 may be made of a durable metal material, and a number of racks may be stacked on top of each other in tiered relation with the base leg sockets 18 of one rack engaging the pyramid-shaped post tops 15 of the supporting rack.

The base 11 of the illustrated rack is comprised of two side channels 19 interconnected by two pairs of tire support rods 20 and a center support member 21. To insure a firm support of two rows of tires 13 the support rods 20 are rectangular-shaped and are disposed so that the sides of the rods form a V-type support. The base legs 16, which are secured to the side channels 19 of the base by welding or other appropriate means, support the base in an elevated position off the floor so that bottom portions of the tires supported by the V-support of the rods 20 may extend slightly below the plane of the rods 20. The legs each are formed with upper sockets 22 which receive and support the uprights 14.

The shelf 12 in this case is comprised of two pairs of tire support rods 24 connected at the opposite ends by end angle members 25. The shelf 12 similarly can support two rows of tires.

In accordance with one aspect of the invention, the shelf 12 is removably supported in an elevated position on the uprights 14 by retaining means attached to the uprights which prevent tilting movement of the shelf when only one side of the shelf is loaded and which cooperate with the shelf to secure the uprights from relative spreading movement, while permitting the shelf to be readily engaged or disassembled from the uprights without auxiliary fasteners such as screws or the like. To this end, a generally C-shaped retainer bracket 26, as best shown in FIG. 2, is secured midway between the ends of each upright 14. The brackets 26 each include a back section 28 welded to the respective upright, an outwardly extending flange 29 for supporting a shelf end member 25, a vertical lip 30 at the end of the flange 29 for preventing relative lateral movement of the shelf, and an overhead horizontal lip 31 formed at the top of the back section for limiting vertical or tilting movement of the shelf. The vertical lip 30 and overhead horizontal lip 31 define an opening through which a shelf end member 25 may be readily inserted for receipt by the retainer bracket 26. When the shelf is supported in its elevated position, the shelf end member 25 rests on the horizontal support flange 26 and is disposed between the back section 28 and the vertical lip 30. It will be appreciated that if tires were loaded on only one side of the shelf 12, any tendency of the shelf to tip would be limited by the overhead lip 31. Moreover, the shelf 12 which is secured at opposite ends by the retainer brackets 26 tends to tie together the uprights 14, preventing relative spreading movement. To insure against converging sideward movement of a pair of uprights supporting a shelf end member 12, depending tabs 35 punched downward from the shelf end member 26 abut against the retainer brackets 26. Thus, it can be seen that the retainer brackets securely support the shelf in an elevated position and yet permit easy assembly and disassembly of the shelf.

In order to enable the rack 10 to store large tractor-size tires, the shelf 12 may be removed from the retainer brackets 26 and be placed on the base 11, as shown in FIG. 7. Large tires 38, shown in phantom, may then be supported on the two inner tire support rods 24 of the shelf 12. When the shelf is in the lowered position, it rests on the base tire support rods 20 with the shelf end members 25 adjacent the inside surfaces of the base legs 16 so as to be secured against longitudinal movement relative to the base. To prevent lateral movement of the shelf on the base in the other direction, depending tabs 36, similar to the tabs 35, are punched downwardly from the shelf end member 25 and engage the base tire support rods 20. In order that the shelf retainer brackets 26 will not interfere with the stored tractor tires, the uprights 14 may be repositioned in their sockets 20 so that the retainer brackets 26 are rotated 90° to a plane parallel to the tires, as shown in FIG. 7.

In accordance with another aspect of the invention, the rack may be readily disassembled and stored as a compact unit. To this end, crossbars 40 are secured between the base center support member 21 and the adjacent base tire support rods 20. After the shelf 12 has been disengaged and removed from the retainer brackets 26 as described above, the uprights 14 each may be removed from their respective base sockets 22 and be placed over the crossbars 40 for storage, as illustrated in FIG. 5. It will be appreciated that in order for the uprights 14 to be compactly stored within the base 11 the uprights must have a length which is less than the length of the base. Preferably, the uprights are short enough to fit between the base side channels 19, and the crossbars 40 are secured near the bottom of the rods 20, 21 so that the uprights when stored lie in approximately the same plane as the base. Two uprights 14 may be positioned on each side of the center support member 21 with the retainer bracket 26 of each upright extending upwardly. The shelf 12 may then be placed on top of the base tire support rods 20 and the stored uprights 14, in a manner similar to when the shelf is used for storing large tires, with the depending tabs 36 engaging the tire support rods 20 to prevent lateral slippage of the shelf from the base.

It will be apparent that a number of disassembled racks 10 may be compactly stored on top of each other as illustrated in FIG. 6. The base legs 16 may be made a sufficient height to protrude above the stored shelf 12 so that the lower tapered leg sockets 18 of one rack at least partially receives the upper leg portion of the other rack to form a relatively rigid stack.

In further carrying out the invention, in order for the rack uprights 14, which must be shorter than the length of the base 11, to be assembled to form a rack having a height greater than the base length to accommodate large tires or double layers of tires, each base leg 16 is formed with a seat which supports the uprights 14 in an elevated position above the floor. The base legs 16 in the illustrated embodiment each are formed from a tubular member 41 having an outwardly flared stamping 42 welded at one end forming the bottom tapered socket 18. In this case, a sleeve 44 is disposed within and at the bottom of the tubular member 41; the top surface of the sleeve 44 forming an elevated seat 45 upon which the upright 14 rests when assembled in the upper leg socket 22. By supporting the assembled post 14 on the seat 45 in an elevated position above the floor, the rack may have a height greater than the length of the base, while the uprights remain short enough to fit compactly between the base side channels for storage. It will be understood that the post supporting seat 45 may be formed within the base leg 16 in various manners. The illustrated arrangement, however, is particularly desirable for economical manufacturing since the inserted sleeve 44 may be of the same stock as the posts 14.

Figure 9:
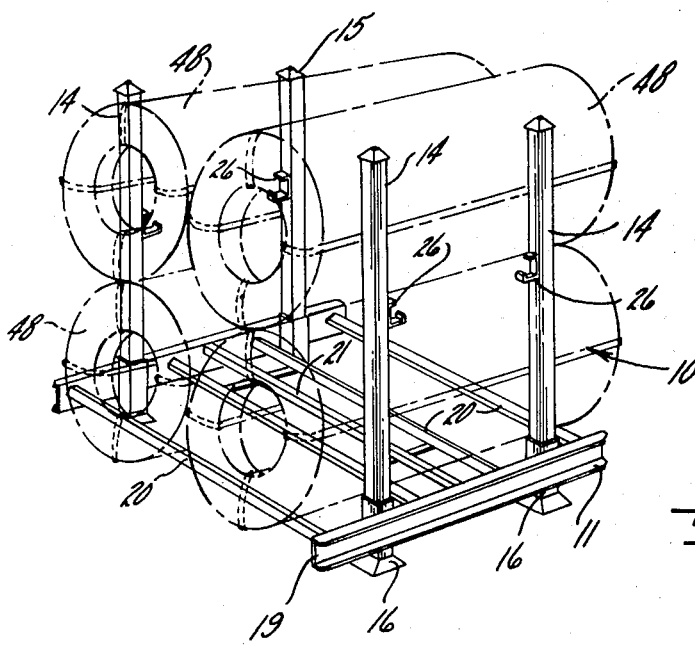
FIG. 9 is a perspective view of the rack shown in FIG. 1 modified to store tied bundles of tires shown in phantom.

Turning now to FIG. 9, it can be seen that the rack 10 also may be adapted to store-typed bundles of tires. In the illustrated arrangement, the rack shelf is removed from the vertical posts 10 and two layers of tied bundles of tires 48, shown in phantom, are positioned across the tires support rods 20 of the base 11. Again, to insure that the brackets 26 do not interfere with the placement or removal of the bundles on the rack base, the posts 14 have been rotated 90° so that the brackets are parallel to the rows of tires.

In view of the foregoing, it is apparent that the rack of the present invention is highly versatile, being capable of storing both tied bundles of tires or individual tires. The rack may be readily modified to accommodate large or regular-size tires and may be easily disassembled for compact storage.

I claim:

1. A tiering rack for tire storage comprising, in combination, a base for supporting a plurality of tires, said base having legs each formed with an upper socket and a lower outwardly tapered socket, a plurality of posts having a length less than the length of said base, said posts each being removably engageable with one of said upper leg sockets so as to be supported in an upright position and form a rack having a height greater than the length of said base, said posts having tapered end portions for supporting a second rack in tiered relation thereto, a shelf for supporting a plurality of tires, said posts having means for removably supporting and securing said shelf in an elevated position above said base, and said base having means for supporting said posts horizontally for storage when said posts are disengaged from said upper leg sockets.

2. The tiering rack of claim 1 in which said shelf comprises a plurality of tire support rods interconnected by a pair of end members, and said shelf supporting means includes a retainer bracket secured to each of said posts, said retainer brackets each having a horizontal flange for supporting said shelf end member, a vertical lip at the end of said flange for limiting horizontal movement of said shelf end member relative to said bracket, and an upper horizontal lip at the top of said bracket for limiting vertical movement of said shelf relative to said bracket, said bracket lips defining an opening through which said shelf end member may be passed for engaging and disengaging said shelf with said bracket.

3. The tiering rack of claim 1 in which said base comprises a plurality of tire support rods interconnected by a pair of end members, and said base means for supporting said posts for storage includes horizontal cross members connected between said tire support rods in a plane below the top of said rods, and said cross members support said posts for storage in substantially the plane of said base support rods.

4. The tiering rack of claim 3 in which said base legs each have an internal seat between said upper and lower sockets, and said posts are supported on said seat when engaged in said upper leg sockets.

5. The tiering rack of claim 3 in which said shelf supporting means is a retainer bracket secured to each of said posts, said shelf comprising a plurality of tire support rods interconnected by a pair of end members, said shelf being positionable on said base support rods when removed from said retainer brackets, said shelf end members having downwardly punched tabs for engaging said base support rods when said shelf is positioned on said base, and said shelf end members having additional downwardly punch tabs for engagement with said retainer brackets when said shelf is supported in an elevated position on said posts.

6. The tiering rack of claim 1 in which said base legs each comprise a tubular member secured to said base, the upper portion of said tubular member defining said upper leg sockets, an outwardly flaring member secured to the lower end of said tubular member defining said lower flaring socket, and a longitudinal insert contained within said tubular member forming a seat upon which said posts rest when engaged in said upper socket.

7. The tiering frame of claim 6 in which said shelf supporting means is a retainer bracket having a horizontal shelf supporting flange secured to said post, a vertical lip at the end of said flange for limiting horizontal movement of said shelf relative to said bracket, an upper horizontal lip for limiting vertical movement of said shelf relative to said bracket, and said bracket lips defining an opening to permit disengagement of said shelf from said bracket.